(12) United States Patent
Jackson et al.

(10) Patent No.: US 6,291,686 B1
(45) Date of Patent: Sep. 18, 2001

(54) EXOTHERMIC PROCESS

(75) Inventors: Samuel David Jackson, Darlington; Frank King, Stokesley; David Graham Shipley, Yarm; Edmund Hugh Stitt, Middlesbrough, all of (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/532,232

(22) Filed: Mar. 22, 2000

Related U.S. Application Data

(63) Continuation of application No. PCT/GB98/02894, filed on Sep. 24, 1998.

(30) Foreign Application Priority Data

Oct. 1, 1997 (GB) .................................................. 9720727

(51) Int. Cl.$^7$ .................................................. C07D 307/60
(52) U.S. Cl. .......................... 549/259; 549/523; 562/476; 562/545; 585/654
(58) Field of Search .................................. 549/259, 523; 562/476, 545; 585/654

(56) References Cited

U.S. PATENT DOCUMENTS

| 4,418,046 | * | 11/1983 | Izumo et al. | 423/245 |
|---|---|---|---|---|
| 4,770,857 | | 9/1988 | Gerhard | 422/111 |

FOREIGN PATENT DOCUMENTS

| 27 29 345 | 1/1978 | (DE) . |
|---|---|---|
| 0 193 511 | 9/1986 | (EP) . |
| 2 275 480 | 8/1994 | (GB) . |
| 98 01222 | 1/1998 | (WO) . |

\* cited by examiner

*Primary Examiner*—Bernard Dentz
(74) *Attorney, Agent, or Firm*—Pillsbury Winthrop LLP

(57) ABSTRACT

An exothermic oxidation process wherein a rotating bed containing a variable oxidation state material is cycled through a succession of stages including an oxidative regeneration stage including a step wherein an oxidising fluid is passed through the bed, and a reaction stage wherein feedstock is passed through the bed, whereby said feedstock is oxidised to give products stream with the concurrent reduction of the convertible material to its lower oxidation state. The process can further include a stage wherein cooling fluid is passed through the bed.

7 Claims, 2 Drawing Sheets

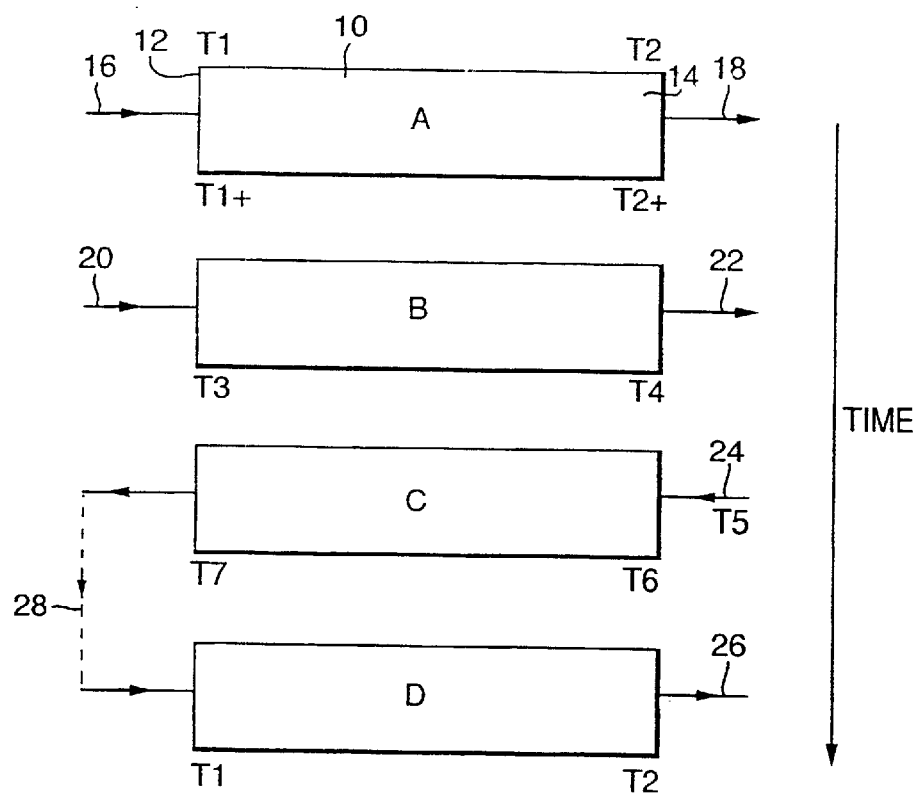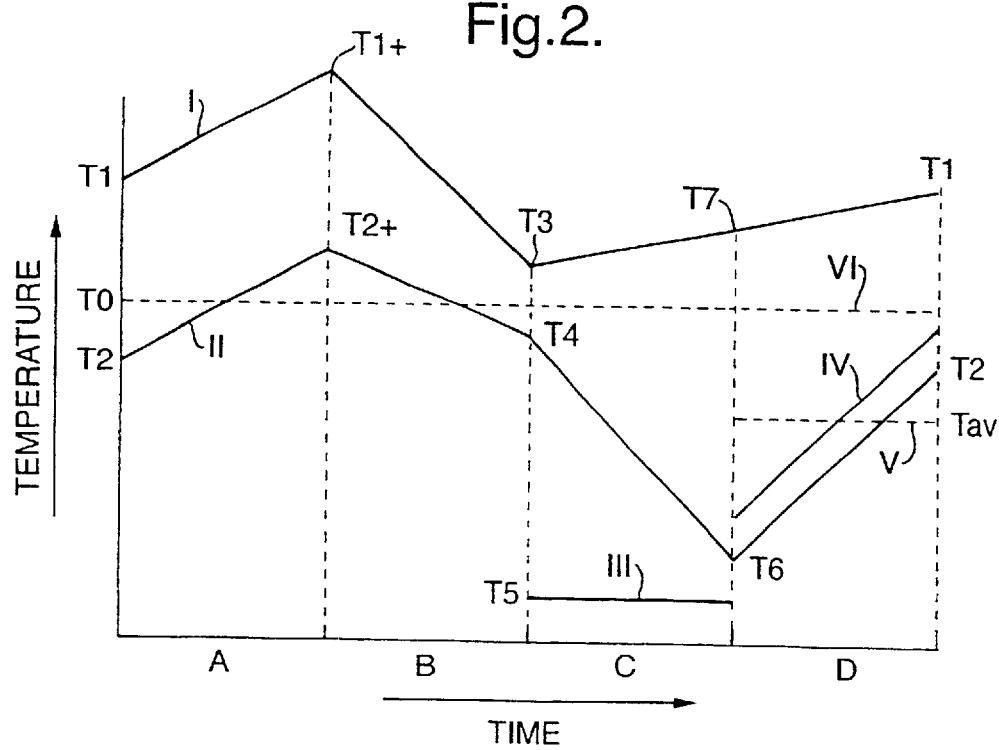

EXOTHERMIC PROCESS

This is a continuation under 35 U.S.C. Section 120 of International application Serial Number PCT/GB98/02894 filed on Sep. 24, 1998 which application designates the U.S.

This invention relates to an exothermic process and in particular to an oxidation process. In such reactions a feedstock stream is contacted with an oxidising agent, often in the presence of a catalyst for the reaction, to a give a products stream. As heat is usually evolved during the reaction, cooling means are often provided to effect control of the reaction and/or to cool the products stream.

One method that has been employed for analogous endothermic processes involves passing a reactants stream through a heated body, which may comprise a bed of material exhibiting catalytic activity for the desired reaction. In such a process, the heated body, hereinafter termed a heat transfer bed, provides the heat required for the endothermic reaction and it is periodically necessary to reheat the bed.

Such endothermic reactions may be effected using a plurality of static beds which are cycled, by switching the flows of reactants etc., through reaction and regeneration stages. Alternatively, and preferably, a rotatable heat transfer bed is employed which is rotated through a regeneration zone, then through a reaction zone, and then returned to the regeneration zone.

U.S. Pat. No. 2,704,741 describes a reactor for that type of process wherein a catalyst bed is disposed in compartments in a rotatable annular vessel: the vessel is disposed between, and sealed against, static outer and inner vessels which are divided into compartments. Provision is made for supply of reactants and regeneration gas to appropriate compartments and for receipt of products and spent regeneration gas from other compartments. The reactants flow radially through the annular vessel between the appropriate compartments of the inner and outer vessels.

U.S. Pat. No. A4,418,046 describes a similar arrangement wherein, instead of the catalyst bed being disposed in separate compartments in the rotating body, the catalyst bed is in the form of a honeycomb structure so that the honeycomb walls serve to separate adjacent flow passages: in this reference, depending on the honeycomb configuration, the flow can be radial or axial.

EP-A-0193511 also describes a similar arrangement wherein a honeycomb catalyst bed is employed with the honeycomb having cells providing axial passages and the flow of reactants etc. is axial.

In GB-A-837707 the dehydrogenation of a hydrocarbon feed is described using a chromia-containing catalyst. It is indicated that during an oxidative regeneration stage, part of the chromia is oxidised from the trivalent state $Cr_2O_3$ to the hexavalent state $CrO_3$. Upon contact of this oxidised catalyst with the feedstock, part of the feedstock is oxidised with the chromia reverting back to the trivalent state, and the heat evolved is used to supply part of the heat required for the enotherrmc dehydrogenation reaction.

We have realised that this principle may advantageously be combined with the aforesaid rortating bed principle and applied to exothermic processes such as oxidation reactions. Where the reaction is catalytic, normally the oxidising agent is a fluid which is mixed with the feedstock prior to contact with the catalyst, or while the feedstock is in contact with the catalyst. However in the present invention, the oxidising agent is in the solid state in the form of a material having upper and lower oxidation states: in a regeneration stage the material, which may also serve as a catalyst for the reaction, is oxidised to the higher oxidation state while in the reaction stage the material is reduced to its lower oxidation state. By providing the material as a rotating bed, various advantages accrue. Thus high heat and mass transfer coeffcients can be achieved, the bed can have a high heat capacity, the amount of catalyst required can be minimised and attrition of the catalyst is minimised. Plug flow operation can be achieved and the associated plant requirements are small.

Accordingly the present invention provides a process for performing an exothermic oxidation reaction using a moving bed containing a solid convertible material that can be oxidised from a lower oxidation state to a higher oxidation state, said moving bed being in the form of a rotatable member having a multiplicity of through flow passages, the walls of which are formed from, or are coated with, or which passages contain, said convertible material, said process comprising:

a) continuously rotating said rotatable member about its axis, whereby each flow passage is moved through a succession of zones including an oxidative regeneration zone, a reaction zone, and then returned to the oxidative regeneration zone;

b) passing an oxidising fluid stream through said oxidative regeneration zone, whereby the convertible material that is in said oxidative regeneration zone is oxidised from said lower oxidation state to said higher oxidation state;

c) passing feedstock through said reaction zone, whereby said feedstock is reacted to give a products stream with the concurrent reduction of the convertible material to its lower oxidation state.

The invention is particularly suited to selective oxidation processes such as the selective oxidation of propene to propene oxide, n-butane to maleic anhydride, isobutene to methacrylic acid or methacrolein, propane to propene, n-butane to n-butene or butadiene, and methane coupling to give ethylene and acetylenes, as by the selection of a suitable convertible material the oxidation can be made more selective, thus reducing the amount of byproducts formed.

Suitable convertible materials include elements exhibiting variable valency, e.g. elements of Groups IIIa. IVa, Va, VIa, VIIa, VIII, Ib, and IIb of the Periodic Table and oxides of such elements. As mentioned previously, the convertible material may be selected to have catalytic activity for the desired reaction. As described in the literature, convertible materials acting as catalysts for the above reactions are often selected from molybdenum- and/or vanadium-containing acids, e.g. heteropolyacids, or salts thereof the acid, or salt, may also contain phosphorus, or is used in admixture with phosphorus compounds. The convertible material may form the sole solid material of the bed, or it may be supported on a suitable substrate.

For any given reaction, the convertible material should be chosen so that the desired reaction reduces the convertible material from its higher oxidation state to the lower oxidation state and the regeneration fluid, and regeneration conditions, selected so that the convertible material is oxidised from the lower oxidation state produced by the aforesaid reaction to the higher oxidation state required for the reaction. It is preferred to select the convertible material such that the regeneration can be effected with air.

Both the regeneration and reaction stages usually produce heat often it is undesired that the products stream carries away all the heat produced as this could involve the production of a products stream at a temperature well above that of the feedstock. It is therefore preferred that the cycle also includes a cooling stage wherein a cooling fluid is passed through the bed containing the convertible material to remove heat produced in said oxidation reactions. Although in some cases the regeneration stage may be effected at a lower temperature than that of the desired reaction, in which case it may be possible to remove the heat as sensible heat in the spent regeneration fluid, generally the regeneration stage will be effected at a temperature above the desired reaction temperature and so a cooling stage is preferably effected before the reaction stage. Where air, or a fluid of higher oxidising power than air, is used as the regeneration fluid, the cooling may be effected by passing air through the bed after the convertible material has been fully oxidised to its higher oxidation state in the regeneration stage. Alternatively an inert cooling fluid may be employed. This is desirable where contamination of the reaction products with an oxidising gas, such as air, is undesirable and/or where the presence of such an oxidising gas in the products stream might create an explosion hazard. Altenmatively, or additionally, as described below, the bed may be used as a heat exchanger to heat the feedstock to the desired reaction temperature: in this case the product stream carries the heat away.

The reaction stage may be effected in two parts, wherein the bed acts as a heat transfer medium to effect heat exchange between the feedstock and the products stream. In the first part of the reaction stage, the feedstock is passed through the bed in a first direction and then in a second part the partially reacted feedstock from the first part of the reaction stage is passed through the bed in the opposite direction. The oxidising fluid is preferably passed through the bed in the direction opposite to that employed in the first part of the reaction stage.

In such a process employing two reaction stages, while all the bed may comprise convertible material, or a support carrying such a convertible material, in some cases it may be desirable to have the portion of the bed at the end into which the feedstock is fed during the first reaction stage, free from convertible material: in this way the initial part of the heating of the reactants, and the final part of the cooling of the products, taking place in the bed is effected in the absence of convertible material.

The invention is illustrated by reference to the accompanying drawings wherein:

FIG. 1 is a diagrammatic representation of a process employing an oxidative regeneration stage, a cooling stage, and two reaction stages;

FIG. 2 is a graphical representation of the temperature profiles at various stages in the process of FIG. 1;

Figure 3:
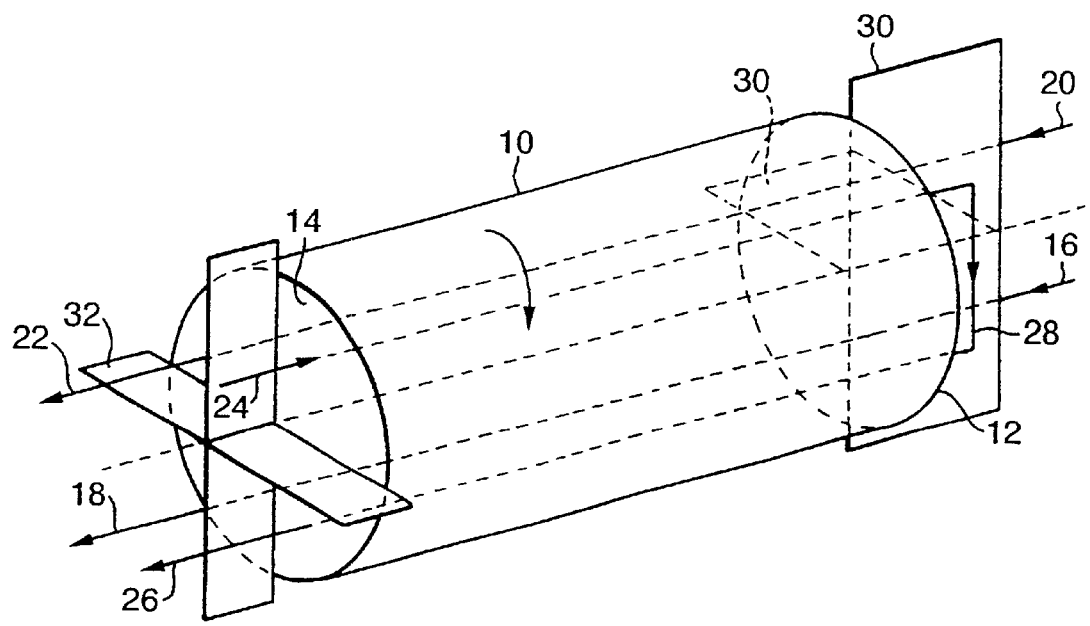
FIG. 3 is a diagrammatic representation of a rotatable catalyst bed arrangement.

Referring to FIG. 1, the oxidative regeneration and cooling stages are designated A and B respectively, and the first and second reaction stages are designated C and D respectively. The bed is designated generally by reference 10 and has first and second ends 12 and 14 respectively. In the following description it is assumed that the reaction proceeds at a significant rate only at temperatures above a temperature designated T0.

At the start of the oxidative regeneration stage A, the bed at the first end 12 has a temperature T1 while that at the second end 14 has a lower temperature T2. Temperature T2 is preferably below temperature T0, however, as described below, this is not necessarily the case. During the oxidative regeneration stage, hot air is fed as the oxidising regeneration fluid to the first end 12 of bed 10 via conduit 16 and spent oxidising regeneration fluid leaves the bed 10 at end 14 via conduit 18. During the oxidative regeneration stage, the convertible material in the bed is oxidised from the lower oxidation state to a higher oxidation state. As a result the bed is heated, with end 12 of the bed being heated to a temperature T1+ and end 14 of the bed being heated to a temperature T2+.

In the cooling stage B, a cooling fluid, e.g. cool nitrogen, is fed to the first end 12 via conduit 20 and leaves the bed at end 14 via conduit 22. During the cooling stage B, the first end 12 of the bed has had its temperature decreased from T1+ to T3 while the second end 14 has had its temperature decreased from T2+ to T4. The temperature of portions of the bed between the ends will generally be between T3 and T4. Temperature T3 will normally be above T0. Temperature T4 may be above or below T2 and above or below T0.

It is assumed for simplicity that the temperatures of the bed at the start of each stage is the same as that at the end of the preceding stage, although, as explained below, there may in some cases be additional interposed stages and, as a result of these interposed stages, the bed temperatures may be modified slightly.

At the start of the first reaction stage C, it is thus assumed that end 12 of the bed 10 has a temperature T3 while end 14 has a temperature T4. During the first reaction stage, feedstock at a temperature T5, below T4 and well below T0, is fed via conduit 24 to end 14 of the bed and so is heated by heat exchange from the bed towards T3 and the desired reaction partially takes place with the heat evolved during the reaction heating the bed. As a result of the heat exchange occurring during the first reaction stage, at the finish of the first reaction stage C, the temperature of the end 14 of the bed has decreased from T4 to a temperature T6 somewhat above T5. The feedstock inlet temperature T5 is preferably, but, as explained below, not necessarily, sufficiently below T0 that T6 is still well below T0. Likewise, at the finish of the reaction stage C, the temperature of end 12 of the bed has increased from T3 to a temperature T7.

During the second reaction stage D, the partially reacted feedstock that has left the end 12 of the bed is fed back through the bed from end 12 to end 14. Further reaction of the feedstock takes place giving a products stream which leaves end 14 of the bed via conduit 26

Since, during the second reaction stage, the temperature at the end 14 of the bed is still below the temperature T0, cooling of the products stream takes place by heat exchange with the bed. This heat exchange results in end 14 of the catalyst bed being heated during the second reaction stage from T6 to T2. At the start of the second reaction stage the end 14 is at temperature T6, which, as indicated above, is determined by the feedstock inlet temperature. Although the products leaving the second reaction stage via conduit 26 will have a temperature above that of end 14, and end 14 will be heated during the second reaction stage to T2, provided that T2 is sufficiently below T0 and/or, as explained below, the products leaving the end 14 at the finish of the second reaction stage are mixed with products leaving end 14 at earlier periods of the second reaction stage, the products leaving the bed via conduit 26 during the second reaction stage can be cooled to a temperature below T0. Also, as a result of the further reaction and heat exchange, the temperature of the bed at the end 12 increases during the second reaction stage from T7 to T1. The bed is then ready for the start of the next cycle.

Since, in the process of the invention, a rotatable member carrying the bed is rotated to continuously move flow passages through oxidative regeneration and the first and second reaction zones in succession, it will be appreciated that the product stream will be a mixture of products leaving flow passages that have been in the second reaction zone for varying periods and so will have a temperature corresponding to the average of the products outlet temperature at the various times of the second reaction stage. Thus the effective products outlet temperature will be lower than that of products leaving flow passages nearing the end of the second reaction stage. Provided that the temperature of the products mixture is below T0, it may not be necessary that T2 is below T0.

Likewise, as shown by the broken line conduit 28, the partially reacted feedstock leaving the first reaction zone at various periods thereof may be mixed before passing to the second reaction zone.

FIG. 2 graphically shows the temperature profiles: for simplicity the profiles are shown as straight lines whereas in reality they will be curves: thus line I shows the profile of the end 12 of the catalyst bed; line II shows the profile of the end 14 of the catalyst bed; line III indicates the temperature T5 of the feedstock fed via conduit 24; line IV shows the profile of the products stream leaving end 14 assuming a constant difference in temperature between the products stream and the end 14; line V indicates the temperature Tav if the products stream from the various periods of the second reaction stage are mixed; and line VI indicates the temperature T0 below which the reaction does not occur at a significant rate. Thus if the products are mixed to give a products stream of temperature Tav, the feedstock temperature T5, and hence temperatures T6 and T2, may be higher, provided that Tav is below T0.

In FIG. 3 there is shown a cylindrical bed 10 having a first end 12 and a second end 14 mounted for rotation about its longitudinal axis in the direction of the arrow. The bed is in the form of a honeycomb having axial through flow passages on the walls of which a convertible material fix the desired reaction is deposited. At end 12 baffles 30 sealed against the end 12 of the rotatable member 10 by means not shown, serve to separate (a) an oxidising regeneration gas inlet region, to which oxidising gas is supplied via conduit 16, from (b) a cooling gas inlet region, to which cooling gas is fed via conduit 20, and from (c) a transfer region 28. At the second end 14 of the rotatable member 10 baffles 32 sealed against end 14 of rotatable member 10 define (d) an oxidising regeneration gas outlet region, from which spent oxidising gas is withdrawn via conduit 18, (e) a cooling gas outlet region, from which the spent cooling gas is withdrawn via conduit 22, (f) a feedstock inlet region, to which feedstock is fed via conduit 24, and (g) a products outlet region, from which products are withdrawn via conduit 26.

That part of the rotatable member 10 between the gas inlet and outlet regions forms the oxidative regeneration zone; that part of the rotatable member between the cooling gas inlet and outlet regions forms the cooling zone; that portion of the rotatable member between the feedstock inlet region and the transfer region forms the first reaction zone; and that portion of the rotatable member between the transfer region and the products outlet region forms the second reaction zone.

The operation of the system is as previously described with the transfer region 28 serving to transfer mixed partially reacted feedstock from the end 12 of the first reaction zone back into end 12 of the second reaction zone, and products outlet conduit 26 serving to permit withdrawal of a mixture of products streams from various periods of the second reaction stage.

The reaction should be effected at a pressure and temperature that enables a useful conversion of the feedstock to take place. For a reaction giving an increase in the number of moles of product over the number of moles of feedstock the reaction pressure is preferably relatively low, particularly in the range 0.1 to 10 bar abs, and very conveniently at a pressure in the range 1 to 2 bar abs. Preferably the reaction, regeneration and cooling stages are effected at similar pressures to minimise pressure differences across the seals between the zones and hence minimise the risk of leakage from one zone to another.

It may be desirable to provide an intermediate zone E, maintained at a pressure lower than the reaction pressure, between the second reaction zone D and the oxidative regeneration zone A in order to obtain greater recovery of the products stream. Alternatively such an intermediate zone E may be a purge zone to which a suitable fluid is supplied.

The convertible material and temperatures employed will of course depend on the desired reaction.

The rate of rotation of the rotatable member, and the proportion of the cycle that is spent in the reaction and regeneration stages will depend on the nature of the oxidation reaction, the size of the rotating member and the reactants flow rates. Typically the duration of the reaction stage or stages will form from 40–80% of the total cycle, with the regeneration stage and any intermediate, e.g. purge, stages forming the balance. The total duration of any such intermediate stages will typically amount to less than the duration of the regeneration stage. The total cycle time is typically at least 30 seconds and is preferably less than 5 minutes, particularly less than 3 minutes.

The invention is illustrated by the following.

Laboratory experiments have demonstrated that n-butane can be selectively oxidised to maleic anhydride by passage at 600° C. over a chromia/alumina catalyst (02.5% by weight Cr). During the oxidation, the chromia is reduced so that the O/Cr atomic ratio decreases from 1.5 to about 1.3, i.e. 0.2 atoms of oxygen are supplied to the oxidation per atom of chromium present. The O/Cr ratio can be restored to 1.5 by treatment with air at 600° C.

It should be noted that this is in contrast to the disclosure of the aforesaid GB 837707 where it was indicated that the part of the chromia was oxidised to the hexavalent state in the regeneration stage. In that reference it was indicated that a relatively long regeneration stage was necessary in order to effect the oxidation to the hexavalent state. Laboratory studies have shown that, with the relatively short cycle times envisaged in the present invention, no oxidation of the chromia to the hexavalent state occurs.

A rotating cylindrical monolith of volume about 20 m$^3$ (diameter about 5 m and length about 1 m) formed from a chromia/alumina catalyst (2.5% by weight Cr) and having axially extending through passages of square cross section of side 1.4 mm and an open area of 67% will contain about 430 kg of chromium and so can donate about 26.4 kg of oxygen per revolution.

If n-butane is fed to the monolith at 600° C. at substantially atmospheric pressure and at a rate of 0.02 kmol/s with a cycle time of about 62 seconds of which about 75% is reaction and 25% is regeneration with air fed at a rate of 0.02 kmols at 600° C., calculations show that maleic anhydride is produced with a conversion of about 19%, and the effluent product stream is at a temperature of 604° C. If a two stage reaction step as described above is employed, the efficient heat exchange that occurs between the reaction products and the feed, the feed butane would not need to be supplied at an elevated temperature.

What is claimed is:

1. A process for performing an exothermic oxidation reaction using a moving bed containing a solid convertible material that can be oxidised from a lower oxidation state to a higher oxidation state, said moving bed being in the form of a rotatable member having a multiplicity of through flow passages, the walls of which are formed from, or are coated with, or which passages contain, said convertible material, said process comprising:

a) continuously rotating said rotatable member about its axis, whereby each flow passage is moved through a succession of zones including an oxidative regeneration zone, a reaction zone, and then returned to the oxidative regeneration zone;

b) a regeneration stage, comprising passing an oxidising fluid stream through said oxidative regeneration zone, whereby the convertible material that is in said oxidative regeneration zone is oxidised from said lower oxidation state to said higher oxidation state;

c) a reaction stage, comprising passing feedstock through said reaction zone, whereby said feedstock is reacted to give a products stream with the concurrent reduction of the convertible material to its lower oxidation state.

2. A process according to claim 1 including a stage wherein a cooling fluid is passed through the bed.

3. A process according to claim 2 wherein the cooling stage is after the regeneration stage but before the reaction stage.

4. A process according to claim 1 wherein the reaction stage is conducted in two parts and the feedstock is passed through the bed in a first direction during the first part of the reaction stage, and then the partially reacted feedstock from the first part of the reaction stage is passed through the bed in the opposite direction during the second part of the reaction stage.

5. A process according to claim 4 wherein, in the regeneration stage, the oxidising fluid is passed through the bed in the direction opposite to that employed in the first part of the reaction stage.

6. A process according to claim 1 wherein the reaction stage or stages forms from 40–80% of the total cycle time.

7. A process according to claim 1 wherein the total cyde time is less than 5 minutes.

\* \* \* \* \*